(12) United States Patent
Pan

(10) Patent No.: US 11,333,920 B2
(45) Date of Patent: May 17, 2022

(54) DISPLAY PANEL

(71) Applicant: Himax Display, Inc., Tainan (TW)

(72) Inventor: Po-Hung Pan, Tainan (TW)

(73) Assignee: Himax Display, Inc., Tainan (TW)

( * ) Notice: Subject to any disclaimer, the term of this patent is extended or adjusted under 35 U.S.C. 154(b) by 5 days.

(21) Appl. No.: 16/748,809

(22) Filed: Jan. 22, 2020

(65) Prior Publication Data

US 2021/0223612 A1 Jul. 22, 2021

(51) Int. Cl.
| | | |
|---|---|---|
| G02F 1/1335 | (2006.01) | |
| G02F 1/1343 | (2006.01) | |
| G02F 1/1333 | (2006.01) | |
| G02F 1/1339 | (2006.01) | |

(52) U.S. Cl.
CPC .... *G02F 1/133512* (2013.01); *G02F 1/13439* (2013.01); *G02F 1/133345* (2013.01); *G02F 1/133504* (2013.01); *G02F 1/134309* (2013.01); *G02F 1/1339* (2013.01); *G02F 1/133562* (2021.01); *G02F 1/133565* (2021.01)

(58) Field of Classification Search
CPC ......... G02F 1/133512; G02F 1/133345; G02F 1/133504; G02F 1/134309; G02F 1/13439; G02F 1/1339; G02F 1/133562; G02F 1/133565
USPC ........................................................ 349/137
See application file for complete search history.

(56) References Cited

U.S. PATENT DOCUMENTS

| | | | | |
|---|---|---|---|---|
| 5,724,111 | A * | 3/1998 | Mizobata | G02F 1/133504 349/112 |
| 5,828,435 | A * | 10/1998 | Kato | G02F 1/1339 349/190 |
| 6,292,241 | B1* | 9/2001 | Hirano | G02F 1/133553 349/113 |
| 2003/0203219 | A1* | 10/2003 | Lin | C23C 14/022 428/457 |
| 2005/0104049 | A1* | 5/2005 | Tsutsui | G02F 1/061 252/583 |
| 2012/0281289 | A1* | 11/2012 | Itoh | G02F 1/133504 359/599 |
| 2014/0125900 | A1* | 5/2014 | Li | G02F 1/133308 349/42 |
| 2017/0108737 | A1* | 4/2017 | Tang | G02F 1/1341 |
| 2018/0321773 | A1* | 11/2018 | Yang | G06F 3/0446 |
| 2018/0374402 | A1* | 12/2018 | Pan | G02F 1/133345 |

* cited by examiner

*Primary Examiner* — Edward J Glick
*Assistant Examiner* — David Y Chung
(74) *Attorney, Agent, or Firm* — JCIPRNET

(57) ABSTRACT

A display panel is provided and includes a first substrate, a second substrate, a light shielding layer, a scattering pattern, a sealant, and a display medium layer. The second substrate is opposite to the first substrate. The light shielding layer is disposed on a top surface of the first substrate away from the second substrate. The scattering pattern is disposed underneath the light shielding layer. The sealant is disposed between the first substrate and the second substrate and shielded by the light shielding layer. The display medium layer is disposed between the first substrate and the second substrate and surrounded by the sealant.

2 Claims, 9 Drawing Sheets

DISPLAY PANEL

BACKGROUND

Technical Field

The disclosure is related to an electronic device, and particularly to a display panel.

Description of Related Art

For demarcating and defining the display region, a display panel is usually disposed with a light shielding layer such as black matrix, wherein the light shielding layer may have a frame-like pattern or a matrix-like pattern to surround the region served as the display region. In some display panels, the light shielding layer may be disposed along the periphery of the display panel to form a ring-like shape so that the unwanted light leakage at the periphery may be shielded or mitigated. Accordingly, the disposition of the light shielding layer may improve the display effect of the display panel.

SUMMARY

The disclosure is related to a display panel having good display effect.

The disclosure provides a display panel including a first substrate, a second substrate opposite to the first substrate, a light shielding layer disposed on a top surface of the first substrate away from the second substrate, a scattering pattern disposed underneath the light shielding layer, a sealant disposed between the first substrate and the second substrate and shielded by the light shielding layer, and a display medium layer disposed between the first substrate and the second substrate and surrounded by the sealant.

In accordance with some embodiments of the disclosure, the light shielding layer is in direct contact with the scattering pattern.

In accordance with some embodiments of the disclosure, the scattering pattern is formed on the top surface of the first substrate at a first region, and the top surface at the first region is closer to the second substrate than the top surface at a second region surrounded by the first region.

In accordance with some embodiments of the disclosure, an antireflective layer is further disposed on the top surface of the first substrate.

In accordance with some embodiments of the disclosure, the antireflective layer exposes the scattering pattern.

In accordance with some embodiments of the disclosure, the scattering pattern is closer to the second substrate than the antireflective layer.

In accordance with some embodiments of the disclosure, the scattering pattern is positioned between the antireflective layer and the light shielding layer.

In accordance with some embodiments of the disclosure, the antireflective layer exposes the first substrate at a region surrounding the light shielding layer.

In accordance with some embodiments of the disclosure, an auxiliary layer is further disposed between the antireflective layer and the light shielding layer, wherein the scattering pattern is formed on the auxiliary layer.

In accordance with some embodiments of the disclosure, a material of the auxiliary layer is different from the light shielding layer.

In accordance with some embodiments of the disclosure, a material of the auxiliary layer comprises a dielectric material.

In accordance with some embodiments of the disclosure, an electrode layer is further disposed on a bottom surface of the first substrate facing the second substrate.

In accordance with some embodiments of the disclosure, the scattering pattern is formed on a bottom surface of the electrode layer away from the first substrate.

In accordance with some embodiments of the disclosure, the bottom surface of the electrode layer with the scattering pattern is closer to the second substrate than the bottom surface of the electrode layer without the scattering pattern.

In accordance with some embodiments of the disclosure, an alignment layer is further disposed on the first substrate and between the display medium layer and the electrode layer.

In accordance with some embodiments of the disclosure, the light shielding layer is spaced from an edge of the first substrate.

In accordance with some embodiments of the disclosure, the scattering pattern presents a surface roughness of greater than 10 nm.

In accordance with some embodiments of the disclosure, a height variation of the scattering pattern is from 1 nm to 100 μm.

In light of the foregoing, the display panel includes a scattering pattern disposed underneath a light shielding layer. The scattering pattern may provide the light scattering effect to reduce the light transmittance at the region where the light shielding region is. Accordingly, the light shielding layer with the underneath scattering pattern may have desirable light shielding effect to enhance the display effect of the display panel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
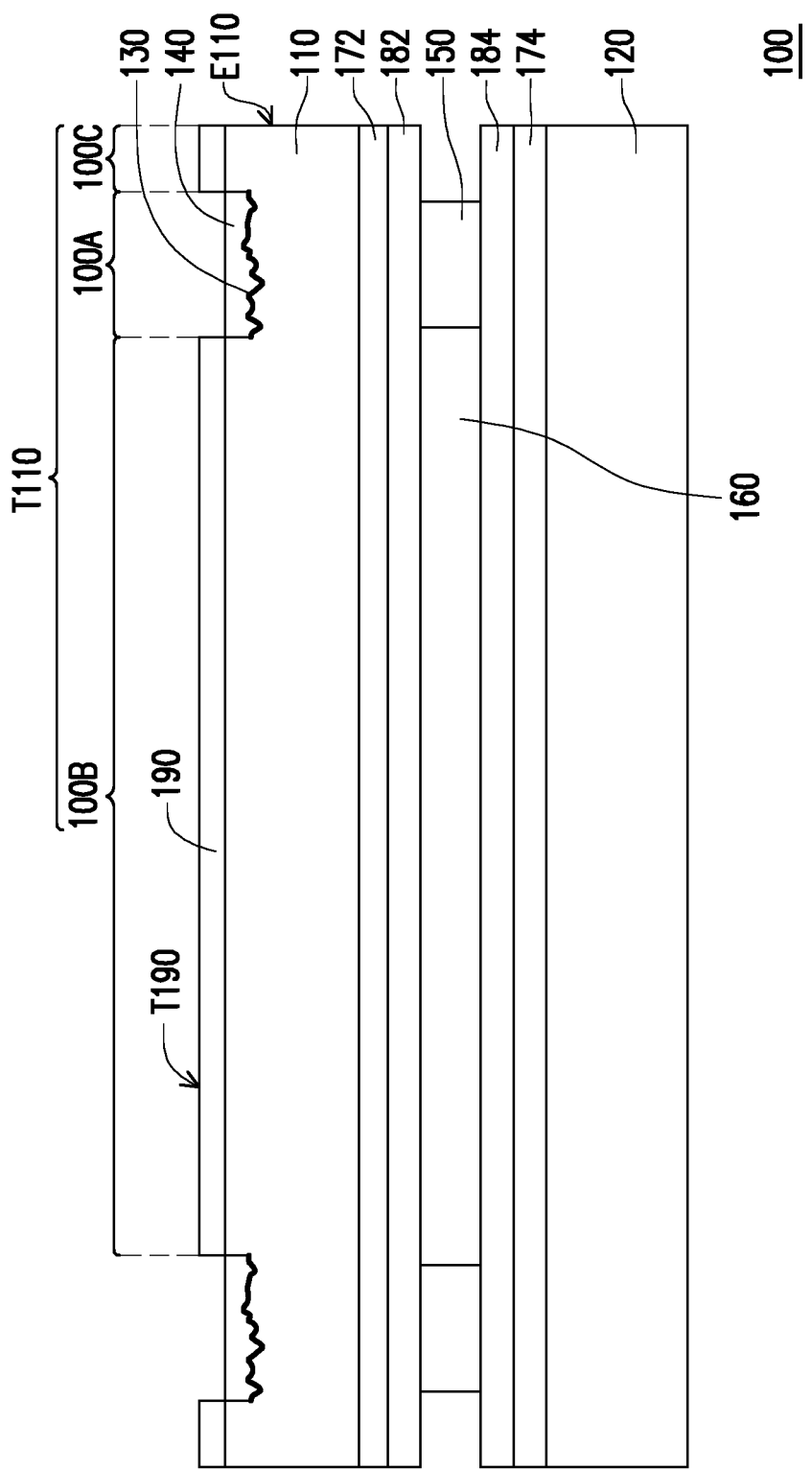
FIG. 1 schematically illustrates a display panel in accordance with an embodiment of the disclosure.

FIG. 1 schematically illustrates a display panel in accordance with an embodiment of the disclosure. In FIG. 1, a display panel 100 includes a first substrate 110, a second substrate 120, a scattering pattern 130, a light shielding layer 140, a sealant 150, and a display medium layer 160. The first substrate 110 is disposed opposite to the second substrate 120 in a top and bottom manner. The light shielding layer 140 is disposed on a top surface T110 of the first substrate 110 facing away from the second substrate 120 and over the scattering pattern 130. The scattering pattern 130 is underneath the light shielding layer 140. The sealant 150 is disposed between the first substrate 110 and the second substrate 120 and shielded by the light shielding layer 130. The display medium layer 160 is disposed between the first substrate 110 and the second substrate 120 and surrounded by the sealant 150. The display panel 100 may display an image with the image light emitting from the first substrate 110. The light shielding layer 140 is disposed at the display side of the display panel 110 to shield unwanted light.

In the present embodiments, the display panel 100 may further include an electrode layer 172, an active layer 174, and a pair of alignment layers 182 and 184 for controlling the display medium layer 160 to display the prescribed image. The electrode layer 172 is disposed on the first substrate 110 and between the first substrate 110 and the display medium layer 160. The active layer 174 is disposed on the second substrate 120 and between the second substrate 120 and the display medium layer 160. The electrode layer 172 and the active layer 174 both are used for generating required electric field capable of driving the display medium layer 160 to display the image. The alignment layer 182 is disposed on the first substrate 110 and in contact with the display medium layer 160. The alignment layer 184 is disposed on the second substrate 120 and in contact with the display medium layer 160. The alignment layer 182 and the alignment layer 184 are used for orienting the molecules in the display medium layer 160 at a prescribed orientation or pre-tilt angle. In addition, the display panel 100 may further include an antireflective layer 190 disposed on the first substrate 110 to at least cover the region surrounded by the light shielding layer 140.

The first substrate 110 and the second substrate 120 may each provide a substantially planar surface for forming film layers thereon and have sufficient rigidity and/or mechanical characteristics to support the display medium layer 160. In some embodiments, the first substrate 110 may be a glass plate, a polymer plate, or the like and the second substrate 120 may be a glass plate, a polymer plate, a wafer plate, or the like. The active layer 174 disposed on the second substrate 120 may be a transistor array such as a thin film transistor array. The display medium layer 160 between the first substrate 110 and the second substrate 120 may include liquid crystal molecules, but the disclosure is note limited thereto. In some embodiments, the active layer 174 disposed on the second substrate 120 may be a CMOS (Complementary Metal-Oxide Semiconductor) device array (not shown) and the second substrate 120 may be silicon wafer such that the display panel 100 may be a Liquid Crystal on Silicon (LCoS) panel. The alignment layers 182 and 184 may be made of organic alignment material, inorganic alignment layer, or a combination thereof.

As shown in FIG. 1, the top surface T110 of the first substrate 110 is patterned at a first region 100A of the display panel 100 to form the scattering pattern 130. The first region 100A may be distributed at a ring-like shape corresponding to the sealant 150 while a second region 100B is surrounded by the first region 100A, and a third region 100C extends between the first region 100A and the edge E110 of the first substrate 110 and surrounds the first region 100A when viewing the display panel 100 in a top view direction so that FIG. 1 shows two parts of the first region 100A and two parts of the third region 100C, but the disclosure is not limited thereto.

In some embodiments, the antireflective layer 190 may be formed on the top surface T110 of the first substrate 110 by depositing a material of the antireflective layer 190 on the entire of the top surface T110 and patterning the material of the antireflective layer 190 to remove at least a portion of the material of the antireflective layer 190. In some embodiments, the material of the antireflective layer 190 may be patterned by a lithography-etching process and the scattering pattern 130 may be formed by a sandblasting process or other etching process after the patterning of the material of the antireflective layer 190. In some alternative embodiments, the material of the antireflective layer 190 may be patterned by a sandblasting process or other etching process and the scattering pattern 130 may be formed simultaneously. In the present embodiment, the antireflective layer 190 may cover the top surface T110 of the first substrate 110 at the second region 100B and the third region 100C of the display panel 100 and expose the scattering pattern 130 at the first region 100A. In other words, the antireflective layer 190 may not overlap the scattering pattern 130, but the disclosure is not limited thereto.

The scattering pattern 130 forming by the sandblasting process or the like may include microstructures to form a roughened surface at the first region 100A of the display panel 100. For example, a surface roughness of the scattering pattern 130 at the first region 100A may be greater than 10 nm which is greater than surface roughness of the top surface T110 at the second region 100B and the third region 100C. In some embodiments, a height variation such as the surface relief of the scattering pattern 130 may be ranged from 1 nm to 100 μm. The microstructures forming the scattering pattern 130 may have irregular distribution, shapes, sizes, depths, and/or the like. For example, each indentation/protrusion of the microstructures may have different shape, size, and/or depth from another indentation/protrusion. The shape of each indentation/protrusion may include rectangle, triangle, trapezoid, circle, oval, polygon, or irregular patterns. In some embodiments, the pitch of the microstructures in the scattering pattern 130 may be smaller than the manufacturing limit of the lithography process. In addition, an entire of the scattering pattern 130 is closer to the second substrate 120 than the antireflective layer 190. In some embodiments, the first substrate 110 may have a reduced thickness at the first region 100A due to the formation of the scattering pattern 130, but the disclosure is not limited thereto.

The light shielding layer 140 may be formed on the scattering pattern 130 by printing light shielding material onto the scattering pattern 130 using an ink-jet printing or other suitable printing process and curing the light shielding material on the scattering pattern 130. In some embodiments, the top surface T190 of the antireflective layer 190 at the second region 100B and the third region 100C of the display panel 100 may be subjected to a hydrophobic surface treatment prior to printing the light shielding material onto the first substrate 110. Accordingly, the uncured light shielding material is limited to be within the first region 100A without exceeding the first region 100A and the light shielding layer 140 formed by cuing the light shielding material may be in direct contact with the scattering pattern 130 and have sharp edge and desirable pattern in the top view.

The light shielding layer 140 may be formed to at least shield the sealant 150. In some embodiments, a width of the light shielding layer 140 may be greater than a width of the sealant 150. In addition, the light shielding layer 140 may further shield a portion of the display medium layer 160 adjacent to the sealant 150 so as to block the unwanted light leakage at the periphery of the display medium layer 160. In some embodiments, the thickness of the light shielding layer 140 may be varied based on the design requirement. For example, the top surface of the light shielding layer 140 facing away from the first substrate 110 may be coplanar, higher or lower than the top surface of the antireflective layer 190 facing away from the first substrate 110. In alternative embodiments, the top surface of the light shielding layer 140 facing away from the first substrate 110 may be coplanar, higher or lower than the bottom surface of the antireflective layer 190 facing the first substrate 110.

In the display panel 100, the scattering pattern 130 disposed underneath the light shielding layer 140 may provide a rough surface capable of scattering the light incident thereon so as to reduce the light transmittance at the first region 100A. For example, in an experimental example, a substrate having the scattering pattern similar to the scattering pattern 130 in the embodiment may have a visible light transmittance of less than 15% while the same substrate without the scattering pattern may have a visible light transmittance of greater than 85% or 80%. In another experimental example, a substrate having the scattering pattern similar to the scattering pattern 130 in the embodiment may have a visible light reflectance of less than 1% at an incident angle of 6 degrees while the same substrate without the scattering pattern may have a visible light reflectance of almost 5%. Accordingly, the light shielding layer 140 with the underneath scattering pattern 130 may provide an enhanced optical density at the first region 100A. To achieve the required light shielding effect, the light shielding layer 140 disposed on the scattering pattern 130 may have a relatively reduced thickness compared to a comparative light shielding layer disposed on a flat and smooth surface, such that the material cost of the light shielding layer 140 may be reduced and the total thickness of the display panel 100 may be thinned.

Figure 2:
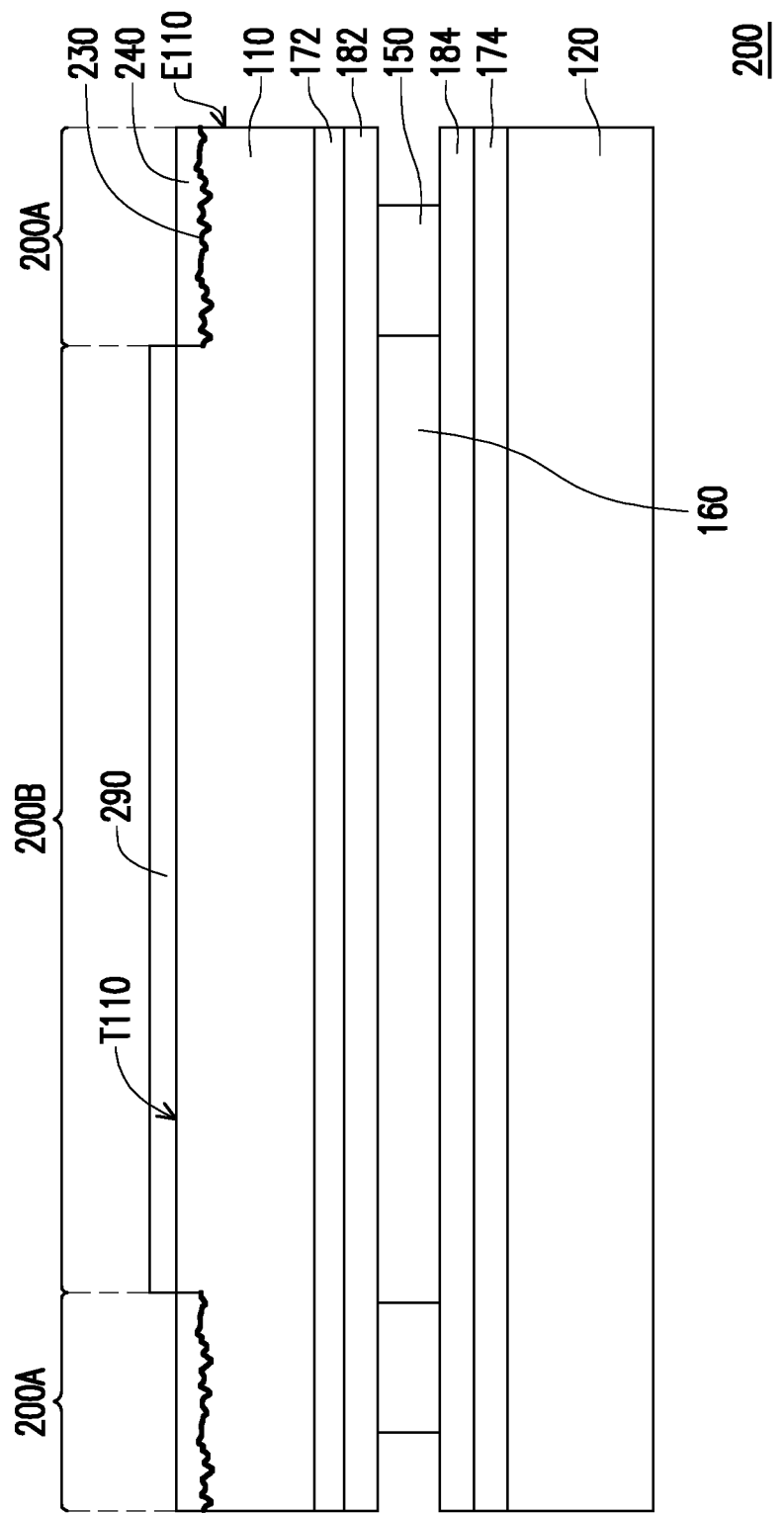
FIG. 2 schematically illustrates a display panel in accordance with an embodiment of the disclosure.

FIG. 2 schematically illustrates a display panel in accordance with an embodiment of the disclosure. As shown in FIG. 2, a display panel 200 may include a first substrate 110, a second substrate 120 opposite to the first substrate 110, a scattering pattern 230 disposed on the first substrate 110, a light shielding layer 240 disposed on the first substrate 110 and over the scattering pattern 230, a sealant 150 between the first substrate 110 and the second substrate 120, and a display medium 160 between the first substrate 110 and the second substrate 120 and surrounded by the sealant 150. In addition, the display panel 200 may further include an electrode layer 172 disposed on the first substrate 110 between the first substrate 110 and the display medium layer 160, an alignment layer 182 disposed on the electrode layer 172, an active layer 174 disposed on the second substrate 120, an alignment layer 184 disposed on the second substrate 120 between the active layer 174 and the display medium layer 160, and an antireflective layer 290 disposed on the first substrate 110. The display panel 200 is similar to the display panel 100 shown in FIG. 1, where the same reference numbers in the two embodiments may refer to the same components and the details of those components may refer to the previous description without reiterating here.

The scattering pattern 230 is formed on the top surface T110 in a first region 200A of the display panel 200 and the light shielding layer 240 is disposed over the scattering pattern 230. The antireflective layer 290 is disposed on the top surface T110 of the first substrate 110 at the second region 200B that is surrounded by the first region 200A. The antireflective layer 290 and the scattering pattern 230 do not overlap with each other. In addition, the first region 200A may extend to be aligned with the edge E110 of the first substrate 110 and the scattering pattern 230 as well as the light shielding layer 240 may be aligned with the edge E110 of the first substrate 110.

The top surface T110 of the first substrate 110 at the first region 200A is subjected to sandblasting, etching or the like to form the scattering pattern 240. The top surface T110 may be relatively elevated at the second region 200B with respect to the first region 200A due to the formation of the scattering pattern 230. The first substrate 110 may have a thinner thickness at the first region 200A and a thicker thickness at the second region 200B. Accordingly, an entire of the scattering pattern 230 may be closer to the second substrate 120 than the top surface T110 at the second region 200B as well as the antireflective layer 290 disposed on the second region 200B. In some embodiments, the thickness of the light shielding layer 240 may be varied based on the design requirement. For example, the top surface of the light shielding layer 240 facing away from the first substrate 110 may be coplanar, higher or lower than the top surface of the antireflective layer 290 facing away from the first substrate 110. In alternative embodiments, the top surface of the light shielding layer 240 facing away from the first substrate 110 may be coplanar, higher or lower than the bottom surface of the antireflective layer 290 facing the first substrate 110.

The scattering pattern 230 is covered by and underneath the light shielding layer 240. The scattering pattern 230 forming by the sandblasting process or the like may include microstructures to present a roughened surface at the first region 200A. The scattering pattern 230 may have a surface roughness greater than 10 nm. A height variation such as the surface relief of the scattering pattern 230 may be ranged from 1 nm to 100 µm. The microstructures forming the scattering pattern 230 may have irregularly distribution, shapes, sizes, and/or the like. Therefore, the scattering pattern 230 presents a light scattering effect which facilitates to reduce the light transmittance at the first region 200A so that the resulted optical density presented by the light shielding layer 240 with the underneath scattering pattern 230 may be enhanced. In some embodiments, the light shielding layer 240 disposed over the scattering pattern 230 may present a prescribed optical density and/or light shielding effect with a thickness thinner than a comparative light shielding layer disposed on a non-patterned and flat portion of the substrate. In other words, to achieve the required light shielding effect, the light shielding layer 240 disposed over the scattering pattern 230 may have a reduced thickness and thus the material cost of the light shielding layer 240 may be reduced and the total thickness of the display panel 200 may be thinned.

Figure 3:
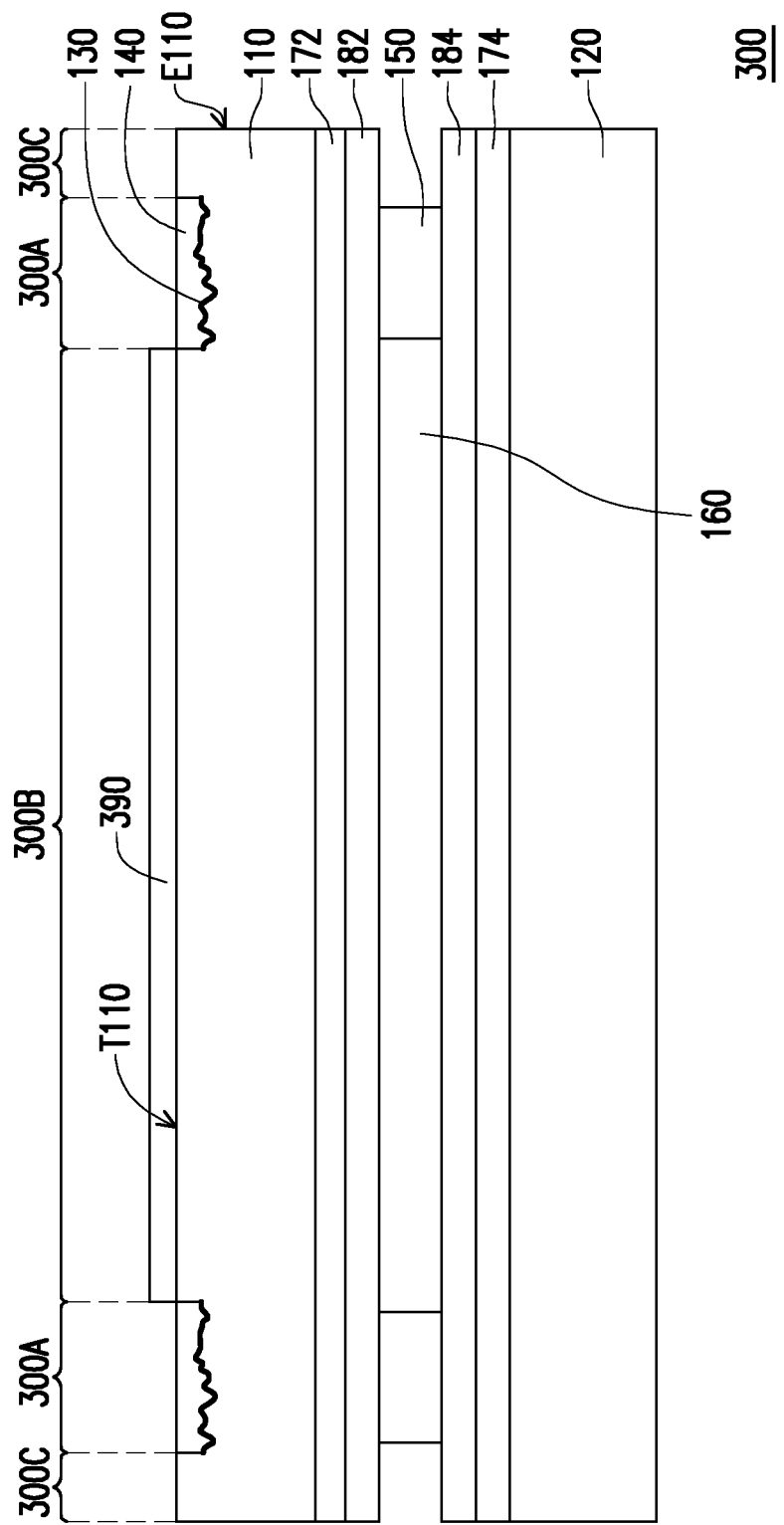
FIG. 3 schematically illustrates a display panel in accordance with an embodiment of the disclosure.

FIG. 3 schematically illustrates a display panel in accordance with an embodiment of the disclosure. As shown in FIG. 3, a display panel 300 may include a first substrate 110, a second substrate 120 opposite to the first substrate 110, a scattering pattern 130 disposed on the first substrate 110, a light shielding layer 140 disposed on the first substrate 110 and over the scattering pattern 130, a sealant 150 between the first substrate 110 and the second substrate 120, and a display medium 160 between the first substrate 110 and the second substrate 120 and surrounded by the sealant 150. In addition, the display panel 300 may further include an electrode layer 172 disposed on the first substrate 110 between the first substrate 110 and the display medium layer 160, an alignment layer 182 disposed on the electrode layer 172, an active layer 174 disposed on the second substrate 120, an alignment layer 184 disposed on the active layer 174, and an antireflective layer 390 disposed on the first substrate 110. The display panel 300 is similar to the display panel 100 shown in FIG. 1, where the same reference numbers in the two embodiments may refer to the same components and the details of those components may refer to the previous description without reiterating here.

In the present embodiment, the scattering pattern 130 is formed on the top surface T110 of the first substrate 110 at the first region 300A and the antireflective layer 390 is formed on the top surface T110 of the first substrate 110 at the second region 300B. In addition, the top surface 110 of the first substrate 110 at the third region 300C is not covered by the antireflective layer 390. Therefore, the top surface T110 at the first region 300A and the third region 300C are exposed and not covered by the light shielding layer 140. The top surface T110 with the scattering pattern 130 formed thereon may be relatively closer to the second substrate 120 than both the top surface T110 at the second region 300B and the third region 300C. In addition, the surface roughness of the top surface T110 at the first region 300A with the scattering pattern 130 thereon may be more significant than the top surface T110 at the second region 300B and the third region 300C.

Figure 4:
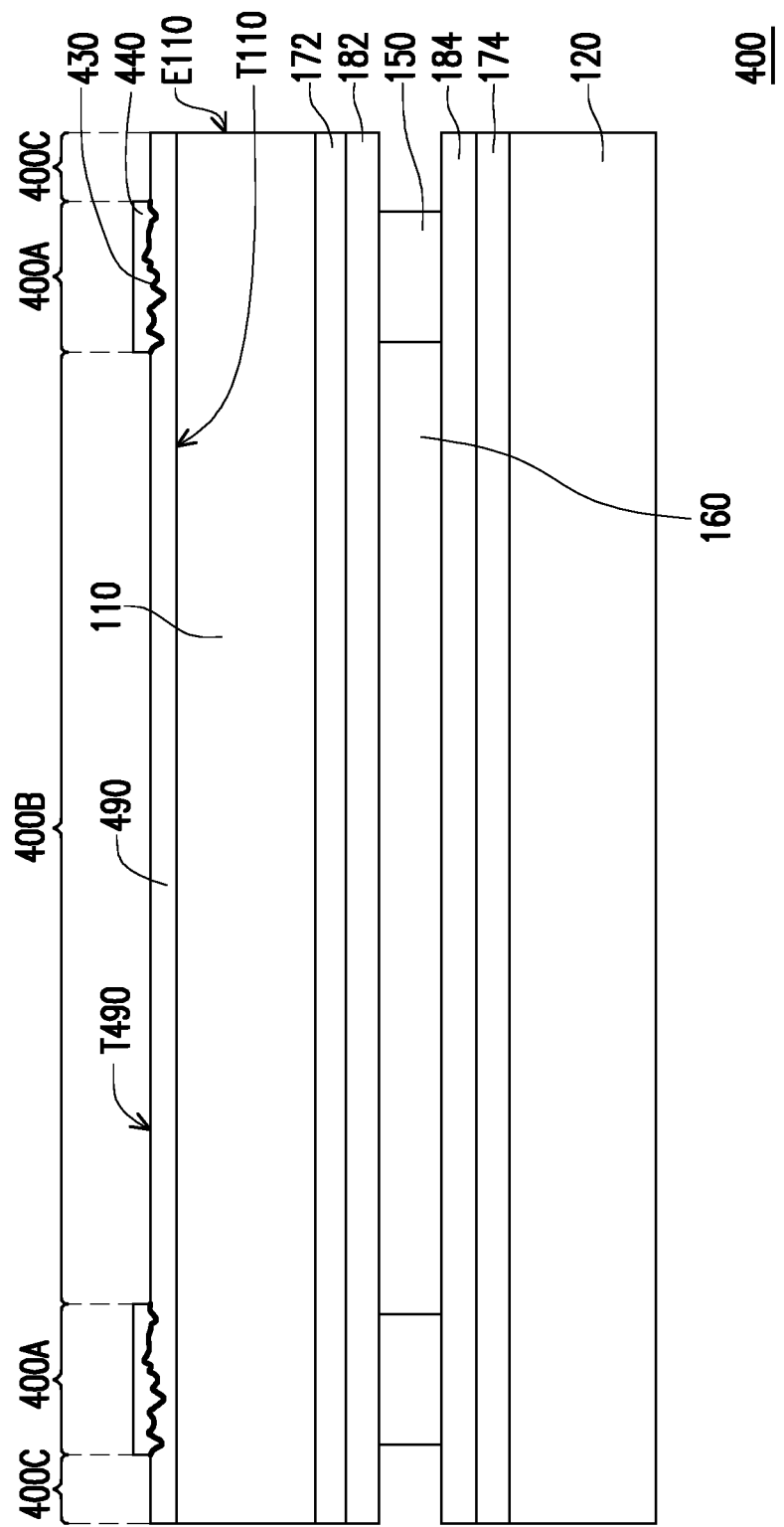
FIG. 4 schematically illustrates a display panel in accordance with an embodiment of the disclosure.

FIG. 4 schematically illustrates a display panel in accordance with an embodiment of the disclosure. As shown in FIG. 4, a display panel 400 may include a first substrate 110, a second substrate 120 opposite to the first substrate 110, a scattering pattern 430 disposed on the first substrate 110, a light shielding layer 440 disposed on the first substrate 110 and over the scattering pattern 430, a sealant 150 between the first substrate 110 and the second substrate 120, and a display medium 160 between the first substrate 110 and the second substrate 120 and surrounded by the sealant 150. In addition, the display panel 400 may further include an electrode layer 172 disposed on the first substrate 110 between the first substrate 110 and the display medium layer 160, an alignment layer 182 disposed on the electrode layer 172, an active layer 174 disposed on the second substrate 120, an alignment layer 184 disposed on the active layer 174, and an antireflective layer 490 disposed on the first substrate 110. The display panel 400 is similar to the display panel 100 shown in FIG. 1, where the same reference numbers in the two embodiments may refer to the same components and the details of those components may refer to the previous description without reiterating here.

The display panel 400 may include a first region 400A, a second region 400B and a third region 400C. The first region 400A may be distributed at a ring-like shape corresponding to the sealant 150 while the second region 400B is surrounded by the first region 400A, and the third region 400C extends between the first region 400A and the edge E110 of the first substrate 110 and surrounds the first region 400A when viewing the display panel 400 in a top view direction so that FIG. 4 shows two parts of the first region 400A and two parts of the third region 400C, but the disclosure is not limited thereto.

The antireflective layer 490 may be disposed on the top surface T110 of the first substrate 110 and continuously cover the entire of the top surface T110, but the disclosure is not limited thereto. The scattering pattern 430 is formed on the antireflective layer 490 at the first region 400A and the light shielding layer 440 is disposed on the scattering pattern 430. In the present embodiment, the first region 400A may be considered as the region where the light shielding layer 440 is, and the antireflective layer 490 at the second region 400B and the third region 400C is not covered by the light shielding layer 440. In other words, the light shielding layer 440 exposes the antireflective layer 490 at the second region 400B and the third region 400C.

In some embodiments, a portion of the antireflective layer 490 at the first region 400A may be subjected to sandblasting, etching or the like. The antireflective layer 490 may not be completely removed during the sandblasting or the etching so as to form the scattering pattern 430 thereon. The light shielding layer 440 is formed on the scattering pattern 430 so that the scattering pattern 430 is sandwiched between the antireflective layer 490 and the light shielding layer 440 at the first region 400A. In some embodiments, a portion of the top surface T490 of the antireflective layer 490 with the scattering pattern 430 thereon may have a surface roughness greater than another portion of the top surface T490 without the scattering pattern 430 thereon. The surface roughness of the portion of the top surface T490 with the scattering pattern 430 may be greater than 10 nm. In some embodiments, the scattering pattern 430 may include irregular microstructures with a height variation ranged from 1 nm to 100 μm. In addition, the portion of the antireflective layer 490 with the scattering pattern 430 thereon may have a thinner thickness than other portions. The entire of the scattering pattern 430 may be closer to the second substrate 120 than the top surface T490 of the antireflective layer 490 at the second region 400B and the third region 400C.

The light shielding layer 440 may be formed on the scattering pattern 430 by a printing process such as ink-jet printing. In some embodiments, the antireflective layer 490 may be subjected to a hydrophobic surface treatment at the second region 400B and the third region 400C prior to printing the light shielding layer 440. As such, during the printing process, the ink material of light shielding layer 440 may be restricted without spreading to the second region 400B and/or the third region 400C. Therefore, the light shielding layer 440 formed by curing the printed light shielding material may have a sharp edge and a desirable pattern in the top view.

The first region 400A may be defined by the light shielding layer 440 and the sealant 150 may be completely located within the first region 400A so that the light shielding layer 440 may shield the sealant 150. A width of the light shielding layer 440 may be greater than a width of the sealant 150 so that the light shielding layer 440 may also shield a portion of the display medium layer 160 adjacent to the sealant 150. The light shielding layer 440 shielding the peripheral portion of the display medium layer 160 may block unwanted light leakage to enhance the display effect of the display panel 400. The scattering pattern 430 is underneath the light shielding layer 440 and able to scatter the light travelling through the scattering pattern 430. Therefore, the light shielding effect provided by the light shielding layer 440 with the underneath scattering pattern 430 may be improved to further enhance the display effect of the display panel 400. In some embodiments, to achieve the same light shielding effect, the thickness of the light shielding layer 440 over the scattering pattern 430 may be thinner than a comparative light shielding layer disposed on a smooth surface, so that the material of the light shielding layer 440 may be saved and the display panel 400 may be thinner.

Figure 5:
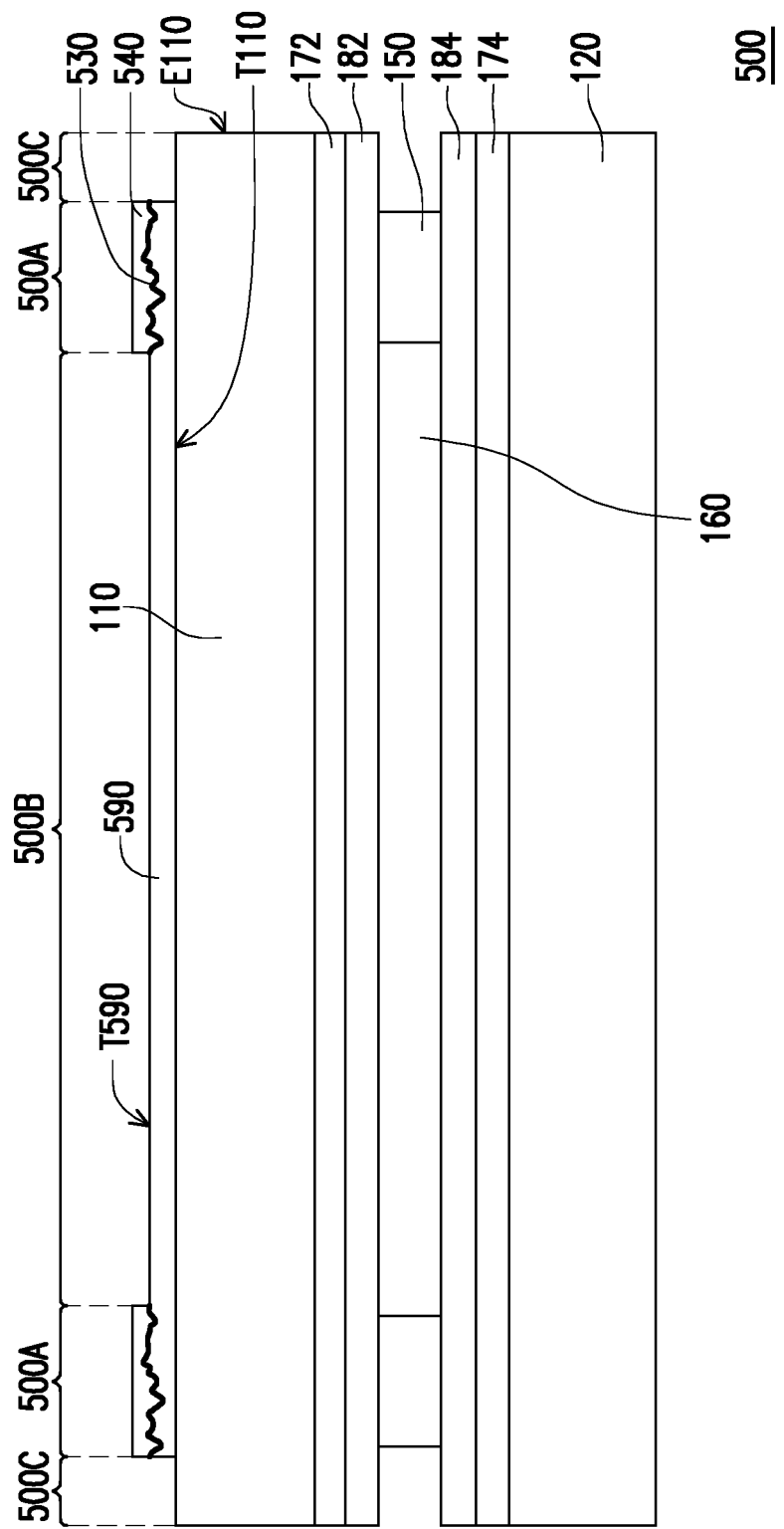
FIG. 5 schematically illustrates a display panel in accordance with an embodiment of the disclosure.

FIG. 5 schematically illustrates a display panel in accordance with an embodiment of the disclosure. As shown in FIG. 5, a display panel 500 may include a first substrate 110, a second substrate 120 opposite to the first substrate 110, a scattering pattern 530 disposed on the first substrate 110, a light shielding layer 540 disposed on the first substrate 110 and over the scattering pattern 530, a sealant 150 between the first substrate 110 and the second substrate 120, and a display medium 160 between the first substrate 110 and the second substrate 120 and surrounded by the sealant 150. In addition, the display panel 500 may further include an electrode layer 172 disposed on the first substrate 110 between the first substrate 110 and the display medium layer 160, an alignment layer 182 disposed on the electrode layer 172, an active layer 174 disposed on the second substrate 120, an alignment layer 184 disposed on the active layer 174, and an antireflective layer 590 disposed on the first substrate 110. The display panel 500 is similar to the display panel 400 shown in FIG. 4, where the same reference numbers in the two embodiments may refer to the same components and the details of those components may refer to the previous description without reiterating here.

The display panel 500 may include a first region 500A with the light shielding layer 540 therein, a second region 500B surrounded by the first region 500A and a third region 500C surrounding the first region 500A. The antireflective layer 590 in the present embodiment is disposed on the first substrate 110 and extends in the first region 500A and the second region 500B while exposes the first substrate 110 at the third region 500C. In other words, the antireflective layer 590 may expose the first substrate 110 at the third region 500C surrounding the light shielding layer 540, and the first substrate 110 at the third region 500C may neither be covered by the light shielding layer 540 nor the antireflective layer 590.

Similar to the embodiment of FIG. 4, the scattering pattern 530 is formed on the antireflective layer 590 at the first region 500A and the light shielding layer 540 is formed on the scattering pattern 530. The sealant 150 may be completely within the first region 500A and shielded by the light shielding layer 540. The light shielding layer 540 may also shield a portion of the display medium layer 160 adjacent to the sealant 150. The light shielding effect of the light shielding layer 540 with the underneath scattering pattern 530 is enhanced so that the unwanted light may be shielded effectively and the display effect of the display panel 500 may be improved.

Figure 6:
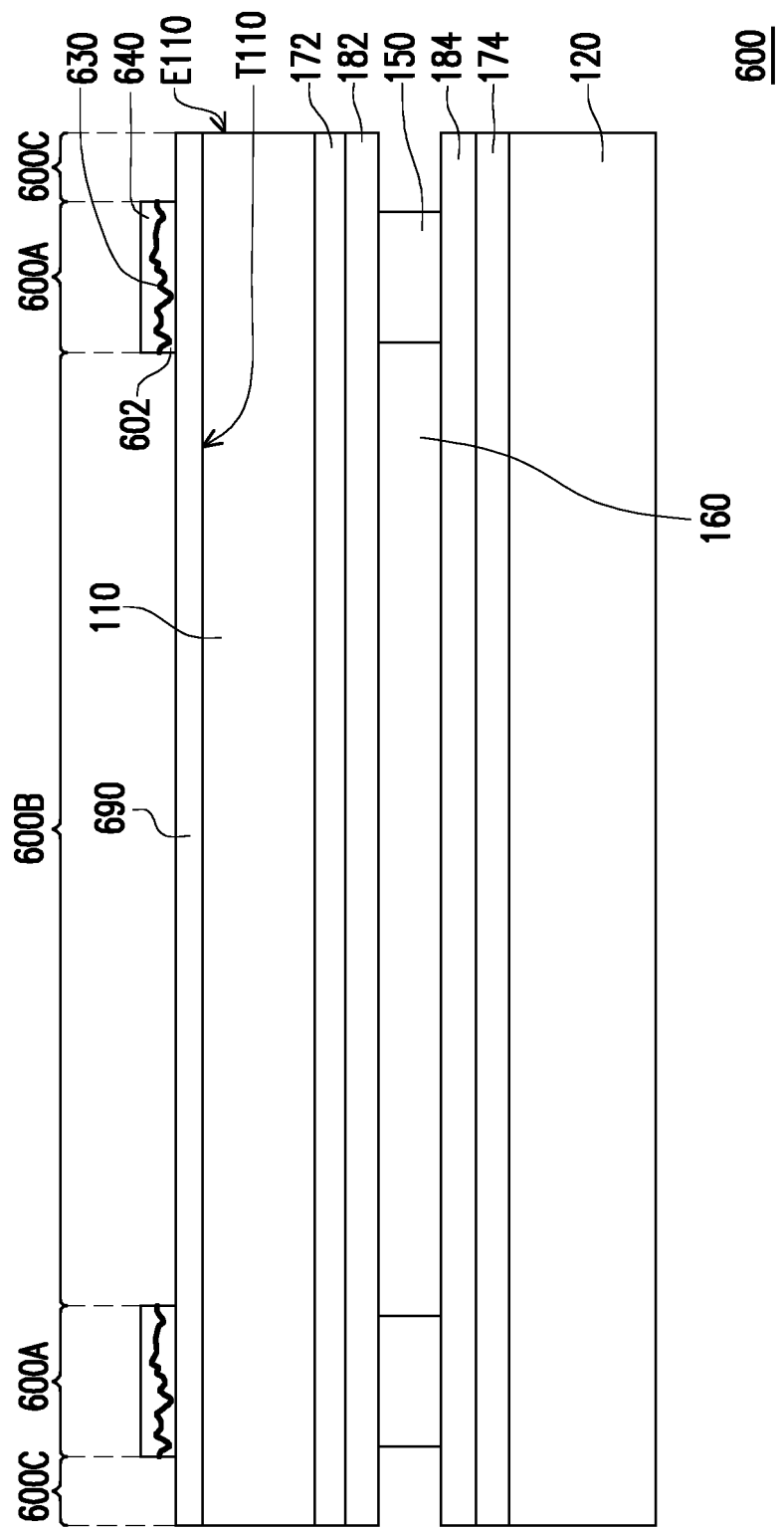
FIG. 6 schematically illustrates a display panel in accordance with an embodiment of the disclosure.

FIG. 6 schematically illustrates a display panel in accordance with an embodiment of the disclosure. As shown in FIG. 6, a display panel 600 may include a first substrate 110, a second substrate 120 opposite to the first substrate 110, a scattering pattern 630 disposed on the first substrate 110, a light shielding layer 640 disposed on the first substrate 110 and over the scattering pattern 630, a sealant 150 between the first substrate 110 and the second substrate 120, and a display medium 160 between the first substrate 110 and the second substrate 120 and surrounded by the sealant 150. The display panel 600 may further include an electrode layer 172 disposed on the first substrate 110 between the first substrate 110 and the display medium layer 160, an alignment layer 182 disposed on the electrode layer 172, an active layer 174 disposed on the second substrate 120, an alignment layer 184 disposed on the active layer 174, and an antireflective layer 690 disposed on the first substrate 110. In addition, the display panel 600 may further include an auxiliary layer 602 disposed on the antireflective layer 690 and between the antireflective layer 690 and the light shielding layer 640. The display panel 600 is similar to the display panel 100 shown in FIG. 1, where the same reference numbers in the two embodiments may refer to the same components and the details of those components may refer to the previous description without reiterating here.

The antireflective layer 690 is disposed on the top surface T110 of the first substrate 110 and covers a first region 600A, a second region 600B and a third region 600C. The antireflective layer 690 substantially covers the entire of the top surface T110 of the first substrate 110. The auxiliary layer 602 is disposed on the antireflective layer 690 at the first region 600A. The scattering pattern 630 is formed on the auxiliary layer 602 and the light shielding layer 640 is formed on the scattering pattern 630. Therefore, the auxiliary layer 602 is disposed between the antireflective layer 690 and the light shielding layer 640.

In the present embodiment, a material of the auxiliary layer 602 may be different from a material of the light shielding layer 640. For example, the material of the auxiliary layer 602 may include dielectric material such as dielectric metal oxide. The auxiliary layer 602 may be completely within the first region 600A and may be subjected to sandblasting, etching, or the like to form the scattering pattern 630 thereon. In other words, the scattering pattern 630 is an uneven structure on the top surface of the auxiliary layer 602. The top surface of the auxiliary layer 602 with the scattering pattern 630 may have a surface roughness of greater than 10 nm which is greater than the top surface of the antireflective layer 690. In some embodiments, the scattering pattern 630 includes microstructures which have a height variation, surface relief, ranged from 1 nm to 100 µm. In addition, the shape, the pitch, the size, or the like of the microstructures of the scattering pattern 630 may be irregular.

The light shielding layer 640 is disposed on the scattering pattern 630 and the scattering pattern 630 is formed on the auxiliary layer 602 so that the scattering pattern 630 may be sandwiched between the light shielding layer 640 and the auxiliary layer 602. The auxiliary layer 602 may be light transparent and the scattering pattern 630 may scatter light. The light transmittance at the first region 600A may be reduced by the scattering pattern 630 and the light shielding effect provided by the light shielding layer 640 with the underneath scattering pattern 630 may be enhanced.

The light shielding layer 640 may be formed on the scattering pattern 630 by using a printing process such as an ink-jet printing process. Before printing the light shielding material on the scattering pattern 630, the antireflective layer 690 may be subjected to a hydrophobic surface treatment at the second region 600B and the third region 600C exposed by the auxiliary layer 602. Therefore, the light shielding material dropping on the scattering pattern 630 may be restricted within the first region 600A without spreading to the second region 600B and/or the third region 600C. The light shielding layer 640 formed by curing the light shielding material on the scattering pattern 630 may have a desirable pattern in the top view. For example, the edge of the top view pattern of the light shielding layer 640 is substantially the same as that of the predetermined pattern.

Figure 7:
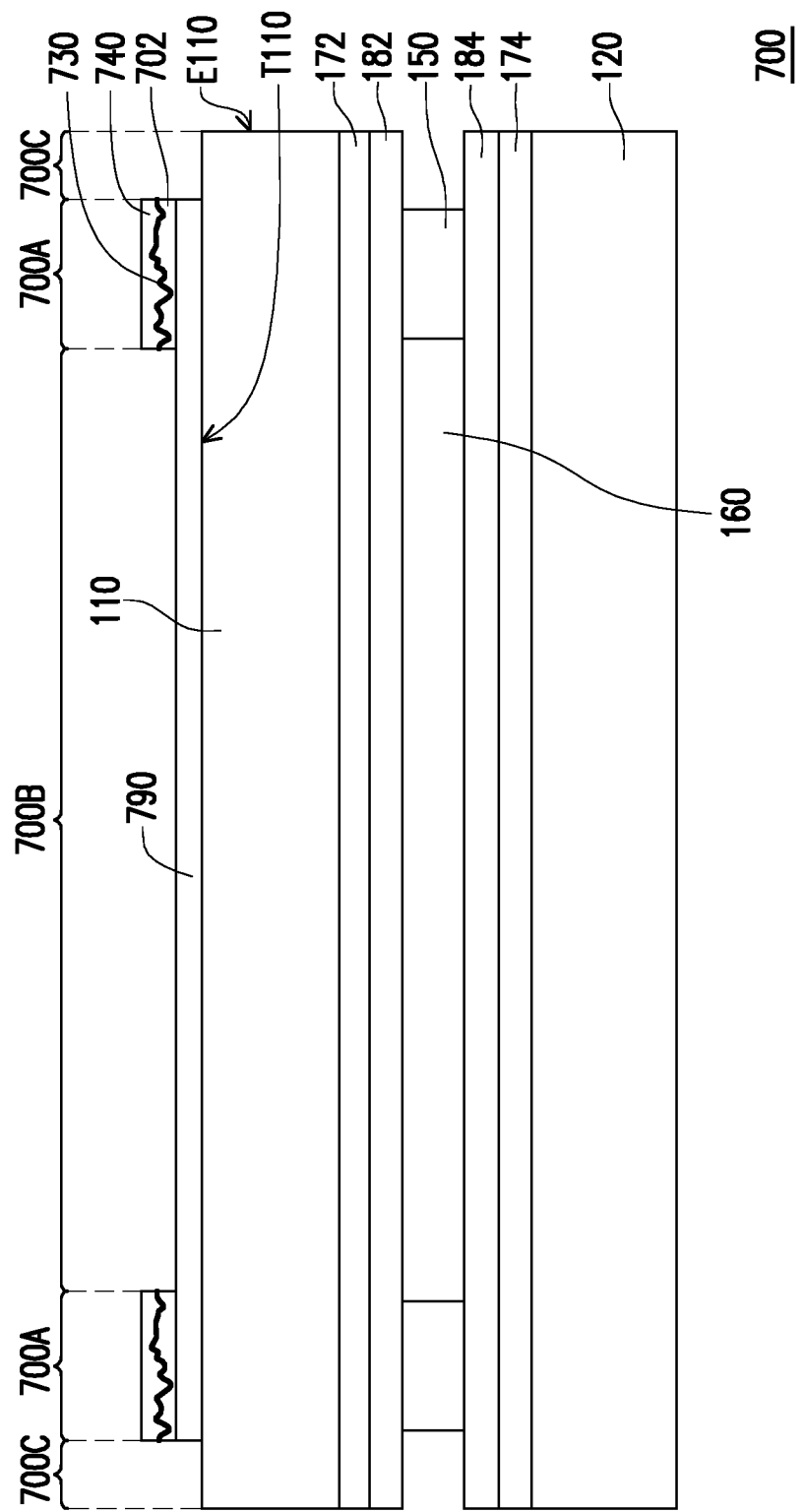
FIG. 7 schematically illustrates a display panel in accordance with an embodiment of the disclosure.

FIG. 7 schematically illustrates a display panel in accordance with an embodiment of the disclosure. As shown in FIG. 7, a display panel 700 may include a first substrate 110, a second substrate 120 opposite to the first substrate 110, a scattering pattern 730 disposed on the first substrate 110, a light shielding layer 740 disposed on the first substrate 110 and over the scattering pattern 730, a sealant 150 between the first substrate 110 and the second substrate 120, and a display medium 160 between the first substrate 110 and the second substrate 120 and surrounded by the sealant 150. The display panel 700 may further include an electrode layer 172 disposed on the first substrate 110 between the first substrate 110 and the display medium layer 160, an alignment layer 182 disposed on the electrode layer 172, an active layer 174 disposed on the second substrate 120, an alignment layer 184 disposed on the active layer 174, and an antireflective layer 790 disposed on the first substrate 110. In addition, the display panel 700 may further include an auxiliary layer 602 disposed on the antireflective layer 790 and between the antireflective layer 790 and the light shielding layer 740. The display panel 700 is similar to the display panel 600 shown in FIG. 6, where the same reference numbers in the two embodiments may refer to the same components and the details of those components may refer to the previous description without reiterating here.

The display panel 700 may include a first region 700A with the light shielding layer 740 therein, a second region 700B surrounded by the first region 700A and a third region 700C surrounding the first region 700A. The antireflective layer 790 in the present embodiment is disposed on the first substrate 110 and extends in the first region 700A and the second region 700B while exposes the third region 700C. In other words, the first substrate 110 at the third region 700C may neither be covered by the light shielding layer 740 nor the antireflective layer 790.

Similar to the embodiment of FIG. 6, the scattering pattern 730 is formed on the auxiliary layer 702 at the first region 700A and the light shielding layer 740 is formed on the scattering pattern 730. The sealant 150 may be completely within the first region 700A and shielded by the light shielding layer 740. The light shielding layer 740 may also shield a portion of the display medium layer 160 adjacent to the sealant 150. The light shielding effect of the light shielding layer 740 with the underneath scattering pattern 730 is enhanced so that the unwanted light may be shielded effectively and the display effect of the display panel 700 may be improved.

Figure 8:
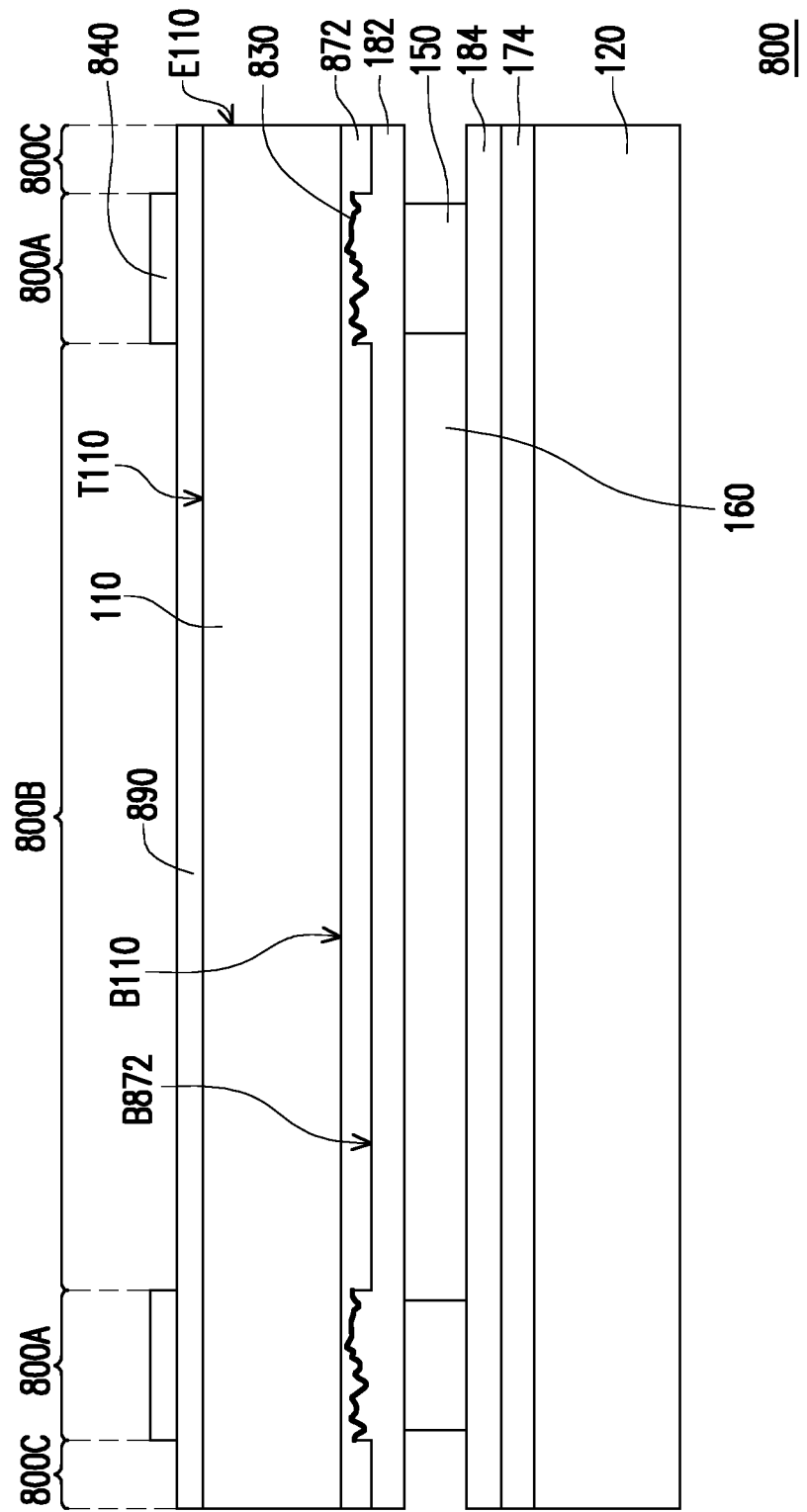
FIG. 8 schematically illustrates a display panel in accordance with an embodiment of the disclosure.

FIG. 8 schematically illustrates a display panel in accordance with an embodiment of the disclosure. As shown in FIG. 8, a display panel 800 may include a first substrate 110, a second substrate 120 opposite to the first substrate 110, a scattering pattern 830 disposed on the first substrate 110, a light shielding layer 840 disposed on the first substrate 110 and over the scattering pattern 830, a sealant 150 between the first substrate 110 and the second substrate 120, and a display medium 160 between the first substrate 110 and the second substrate 120 and surrounded by the sealant 150. The display panel 800 may further include an electrode layer 872 disposed on the first substrate 110 between the first substrate 110 and the display medium layer 160, an alignment layer 182 disposed on the electrode layer 172, an active layer 174 disposed on the second substrate 120, an alignment layer 184 disposed on the active layer 174, and an antireflective layer 890 disposed on the first substrate 110. The display panel 800 is similar to the display panel 100 shown in FIG. 1, where the same reference numbers in the two embodiments may refer to the same components and the details of those components may refer to the previous description without reiterating here.

The display panel 800 may include the first region 800A, a second region 800B surrounded by the first region 800A and a third region 800C surrounding the first region 800A. The antireflective layer 890 is disposed on the top surface T110 of the first substrate 110 and substantially covers the entire of the top surface T110. The light shielding layer 840 is disposed on the antireflective layer 890 at the first region 800A. Specifically, the first region 800A may be considered as a region where the light shielding layer 840 is. In some embodiments, the light shielding layer 840 may be formed by a printing process. The portions of the antireflective layer 890 at the second region 800B and the third region 800C may be subjected to a hydrophobic surface treatment prior to printing the light shielding layer 840 so that the light shielding layer 840 may be formed with a desirable pattern in the top view, but the disclosure is not limited thereto. In some embodiments, the portion of the antireflective layer 890 at the third region 800C may be removed so that the first substrate 110 at the third region 800C may be exposed by the antireflective layer 890. In some alternative embodiments, the light shielding layer 840 as well as the scattering pattern 830 may extend outwardly to be aligned with the edge E110 of the first substrate 110 so that the display panel 800 may not include the third region 800C.

The electrode layer 872 is disposed on the bottom surface B110 of the first substrate 110 facing the second substrate 120 and the alignment layer 182 is disposed on the electrode layer 872 between the electrode layer 872 and the display medium layer 160. The scattering pattern 830 is formed on a bottom surface B872 of the electrode layer 872 away from the first substrate 110. The scattering pattern 830 is formed at the first region 800A so that the scattering pattern 830 is underneath the light shielding layer 840. In some embodiments, the portion of the electrode layer 872 at the first region 800A may be subjected to sandblasting, etching or the like to form the scattering pattern 830. The portion of the electrode layer 872 having the scattering pattern 830 may have a thickness smaller than the other portion of the electrode layer 872 outside the scattering pattern 830. In some embodiments, the bottom surface B872 of the electrode layer 872 with the scattering pattern 830 may be further from the second substrate 120 than the bottom surface B872 of the electrode layer 872 outside the scattering pattern 830.

In the present embodiment, the scattering pattern 830 underneath the light shielding layer 840 provides a light scattering effect to enhance the light transmittance t at the first region 800A. The sealant 150 may be completely within the first region 800A so as to be shielded, In addition, the shielding area of the light shielding layer 840 may exceed the area of the sealant 150 so that a portion of the display medium layer 160 adjacent to the sealant 150 may also be shielded. As such the light leakage at the periphery of the display medium layer 160 may be blocked or mitigated by the shielding effect provided by the light shielding layer 840 with the underneath scattering pattern 830.

Figure 9:
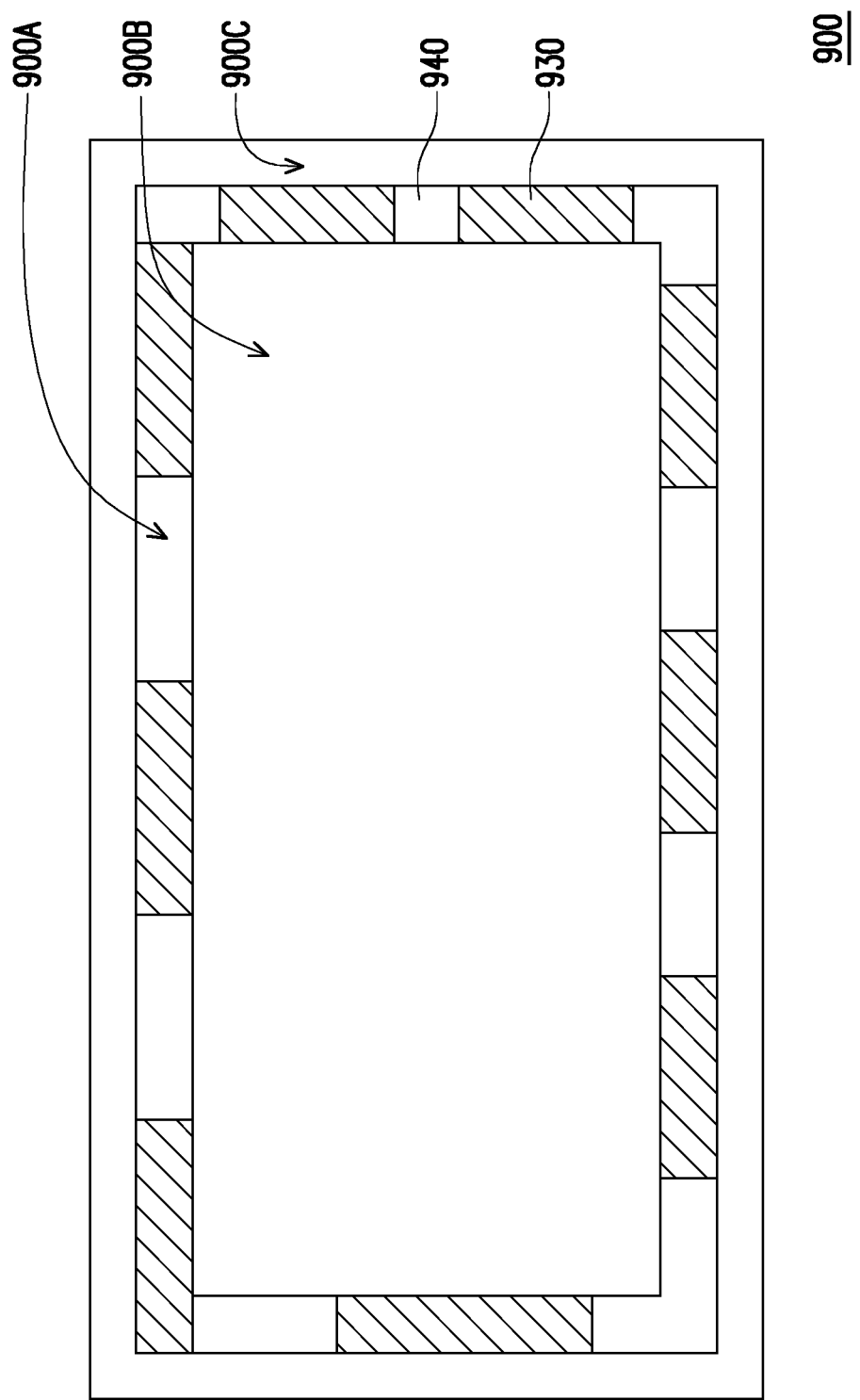
FIG. 9 schematically illustrates a top view of a display panel in accordance with some embodiments of the disclosure.

FIG. 9 schematically illustrates a top view of a display panel in accordance with some embodiments of the disclosure. In FIG. 9, a top view of a display panel 900 may be an exemplary example of the top view of any of the above display panels 100 to 800 and may present only a portion of the components in the display panel for illustration purpose. Specifically, FIG. 9 only shows the outline, the scattering pattern 930, and the light shielding layer 940 of the display panel 900 in the top view. The display panel 900 may further includes the first substrate, the second substrate, the sealant, the display medium layer, the antireflective layer, the electrode layer, the active layer, the alignment layers and/or the auxiliary layer depicted in any of the above embodiments.

In FIG. 9, a first region 900A is the region where the light shielding layer 940 is, a second region 900B is the region surrounded by the first region 900A, and a third region 900C is the outer peripheral region surrounding the first region 900A. The first region 900A may have a ring-like shape in the top view, but the disclosure is not limited thereto. The scattering pattern 930 may be disposed in the first region 900A and overlap with the light shielding layer 940. In the present embodiment, the scattering pattern 930 may not completely fill the first region 900A in the top view. Instead, the scattering pattern 930 may include several blocks distributed in the first region 900A with a space between each other. However, in some alternative embodiments, the scattering pattern 930 may completely fill the first region 900A and have the same top view pattern as the light shielding layer 940. The pattern design of the scattering pattern 930 may be applied to any of the above embodiments.

In view of the above, the display panel includes a light shielding layer and a scattering pattern disposed underneath the light shielding layer to at least shield the sealant and the region adjacent to the sealant. The scattering pattern may provide the light scattering effect to reduce the light transmittance at the region where the light shielding region is. Accordingly, the light shielding layer with the underneath scattering pattern may have desirable light shielding effect to enhance the display effect of the display panel.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A display panel, comprising:
a first substrate;
a second substrate opposite to the first substrate;
a light shielding layer on a top surface of the first substrate facing away from the second substrate;
a scattering pattern, disposed underneath the light shielding layer;
an electrode layer disposed on a bottom surface of the first substrate facing the second substrate, wherein the scattering pattern is formed on a bottom surface of the electrode layer away from the first substrate;
a sealant disposed between the first substrate and the second substrate and shielded by the light shielding layer; and
a display medium layer disposed between the first substrate and the second substrate and surrounded by the sealant,
wherein the bottom surface of the electrode layer with the scattering pattern is closer to the second substrate than the bottom surface of the electrode layer without the scattering pattern.
2. The display panel according to claim 1, further comprising an alignment layer disposed on the first substrate and between the display medium layer and the electrode layer.

* * * * *